United States Patent

[11] 3,539,004

[72] Inventors Gene O. Baker and
 Robert H. Cadwallader, Wappingers Falls,
 and Charles P. Marinelli,
 Poughkeepsie, New York
[21] Appl. No. 737,681
[22] Filed June 17, 1968
[45] Patented Nov. 10, 1970
[73] Assignee International Business Machines
 Corporation
 Armonk, New York
 a corporation of New York

[54] HANDLING AND TESTING MINIATURE
 MAGNETIC ELEMENTS
 20 Claims, 9 Drawing Figs.
[52] U.S. Cl.................................................. 209/73,
 209/75, 209/81, 209/11.8; 324/34
[51] Int. Cl.......... ............................................... B07c 1/04
[50] Field of Search.......................................... 209/73—
 75, 81, 81.1, 111.8; 324/34(MCT Digest)

[56] References Cited
UNITED STATES PATENTS
2,054,320 9/1936 Hanson ......................... 209/73X
2,796,986 6/1957 Rajchman .................... 209/111.8X
3,415,368 12/1968 Vosika ......................... 209/81X Primary Examiner—Richard A. Schacher
Attorney—Hanifin and Jancin and A. Sidney Alpert ABSTRACT: Toroidal magnetic cores are conveyed by a vibratory feeder to a pickup station where they are transferred into plural vacuum pockets of a rotatable transfer wheel. A sector of the transfer wheel is disposed in a recess in the feed bowl for receiving the cores. Rotation of the wheel by a stepping motor carries the cores and a probe carrier or barrel to a test station. The probe barrel carries multiple probes, one for each vacuum pocket, and stationary overhead cam and internal springs provide reciprocatory motion to the probes. At the test station, a probe is inserted through the core into engagement with multiple contacts and preselected tests are performed upon the core. The test results are stored in a register and used to operate a fluidic sorting means for sorting the cores into acceptable and unacceptable categories.

Patented Nov. 10, 1970

INVENTORS
GENE O. BAKER
ROBERT H. CADWALLADER
CHARLES P. MARINELLI

BY *P. Sidney Alpert*

ATTORNEY

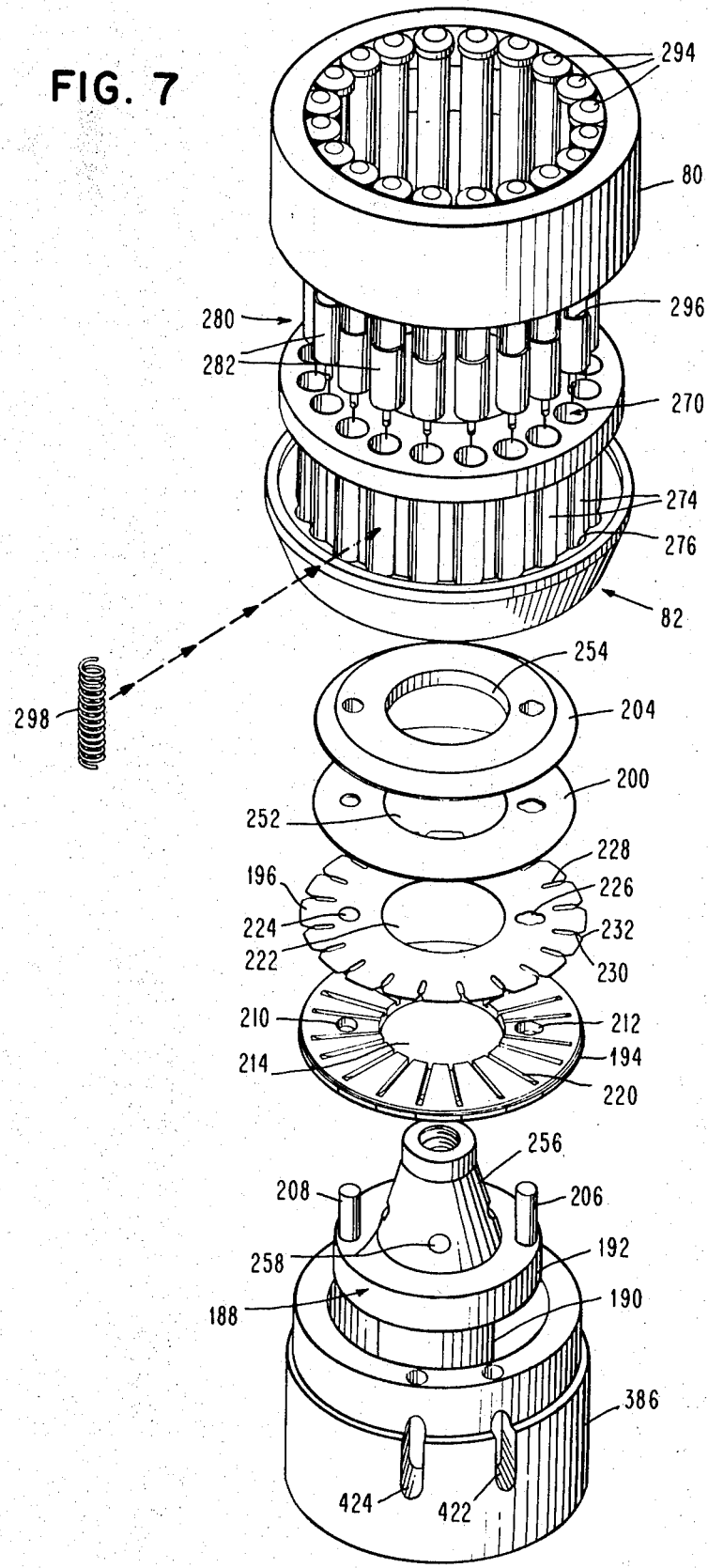

3,539,004

HANDLING AND TESTING MINIATURE MAGNETIC ELEMENTS

BACKGROUND OF THE INVENTION

This invention relates to the field of testing and sorting of magnetic elements, and more specifically to improved apparatus and methods of handling and testing miniature ferrite cores of the type used in computer core memory systems.

Small ferrite cores of toroidal or similar shapes are used in magnetic core memory systems for computers and in other magnetic circuits. These cores normally are individually tested to insure their magnetic uniformity since it is virtually impossible to control manufacturing conditions to the extent necessary to produce uniform cores. If the cores in the memory system, for example, do not have uniform magnetic properties or characteristics, there would be extremely complex problems in providing electrical circuitry for operating the magnetic core memory.

Since it is necessary to put all the cores individually through a series of electrical tests, several types of prior art apparatus have been developed for testing magnetic cores. These prior art apparatus range from simple hand-operated devices, to machines that feed, test and sort cores automatically. The prior art machines are generally satisfactory when larger cores are tested, and when the number of cores to be tested is not particularly great and hence speed is not essential. However, even the automatic machines of the prior art suffer from several common deficiencies, including the inability to accurately handle or test very small or miniature cores, or to test at high rates. For purposes of definition, we mean by referring to small or miniature cores, those cores that have an outer diameter less than 21 m.m. and an inner diameter less than 13 m.m. What we mean by testing at high rates is a machine throughput of at least 15 cores per second, or greater. In addition, other deficiencies of previous core testing apparatus involve high tool wear, necessitating frequent down or maintenance periods and high tooling costs, a relatively great amount of down time required to change over from testing one core type to another, and general inaccuracy in handling and positioning magnetic cores during tests.

Accordingly, in general, it is an object of this invention to provide improved apparatus and methods of handling and testing magnetic cores that overcome the deficiencies of apparatus known to the prior art.

It is another, more specific, object of the present invention to provide improved apparatus and methods capable of testing and sorting miniature cores at very high speeds, with minimum tooling costs and down times, and with extreme accuracy and reliability.

SUMMARY OF THE INVENTION

In one form of the present invention, we provide apparatus for testing miniature magnetic cores that includes a vibratory feeder into which a plurality of the cores are loaded for feeding to a pickup station. The feeder bowl has an arcuate recess in which is located a sector of a transfer wheel having a plurality of peripheral pickup means. The pickup means, in the preferred embodiment, are vacuum pockets, and in the preferred embodiment the sector of the wheel located at the pickup station contains a plurality (at least two but preferably six) of these pockets for receiving cores from the vibratory feeder substantially simultaneously. This arrangement provides much faster pickup than is available in presently known core handling and/or testing apparatus. In the available apparatus, the cores are presented in single file either to a probe or to a carrier for transport one at a time to a testing station. This serial or single file feeding of the cores presents a bottleneck and limits the throughput or speed of the prior art apparatus. Thus, for example, the faster prior art core tester of which we are aware has a maximum throughput or speed of approximately 15 cores per second. On the other hand, the apparatus of the present invention is capable of speeds ranging up to 90 cores per second, or even faster.

In the exemplified embodiment, there is one test probe for each vacuum pocket, with a total of 20 vacuum pockets and probes. The probes are carried in a probe barrel or carrier that is mounted, along with the transfer wheel, on the output shaft of a stepping motor. The barrel and wheel therefore rotate together. A stationary overhead cam, and internally mounted springs, provide the reciprocation, or driving and return means, for the probes. A probe is driven into the center of a core operating adjacent a test station and into engagement with a plurality of electrical contacts present at the test station. Connected to the contacts are driving and sense circuits that generate and pick up test pulses through the probe and core in a manner conventional in the art. By way of example, the test circuits shown in U.S. Pats. 2,985,300; 2,711,519; and/or 2,679,025 are several conventional magnetic core test circuits that could be used with this invention.

An internal fluid handling and sorting arrangement is provided that enables cores to be retained in the vacuum pockets from the pickup station, through the test station, and to a sorting station. At the sorting station there are accept and reject means for receiving cores that have been tested. Acceptable cores are rejected from the vacuum pockets by a fluid pulse that overrides the vacuum, under control of the test circuit. Unacceptable cores pass the accept means and are rejected into the reject means.

In the illustrated apparatus, tool wear is minimized since the test probes do not come into physical contact with the cores and since contact bounce is eliminated. In this latter regard, each succeeding test probe picks up the electric contacts before the preceding probe is disengaged therefrom. Further, the alignment between cores and test probes is precise, preventing damage to either probes or cores during operation. Further advantages of the present invention will become apparent hereinafter to those skilled in the art.

In accordance with another aspect of the invention, we provide an improved method for testing miniature magnetic elements such as magnetic cores. In the preferred method, a plurality of magnetic cores are fed by a vibratory feeder to a pickup station where both a plurality of pickup means and a plurality of cores are available. The feeding of cores is therefore essentially in parallel, rather than serial as in the prior art. A sector of the transfer wheel is always disposed at the test station for receiving the cores. The cores are carried by the transfer wheel to the test station and a probe is inserted axially through the center of each core, into engagement with multiple contacts and appropriate tests upon the core are carried out. The results of the electrical tests are stored in a register that operates a fluidic sorting means for sorting the cores into acceptable and unacceptable categories, with the cores being ejected from the transfer wheel into accept and reject means.

BRIEF DESCRIPTION OF THE DRAWINGS

FIG. 7 is an exploded perspective view of portions of the transfer wheel and probe assembly comprising a portion of the exemplified apparatus;

DESCRIPTION OF THE PREFERRED EMBODIMENTS

General Description

Figure 1:
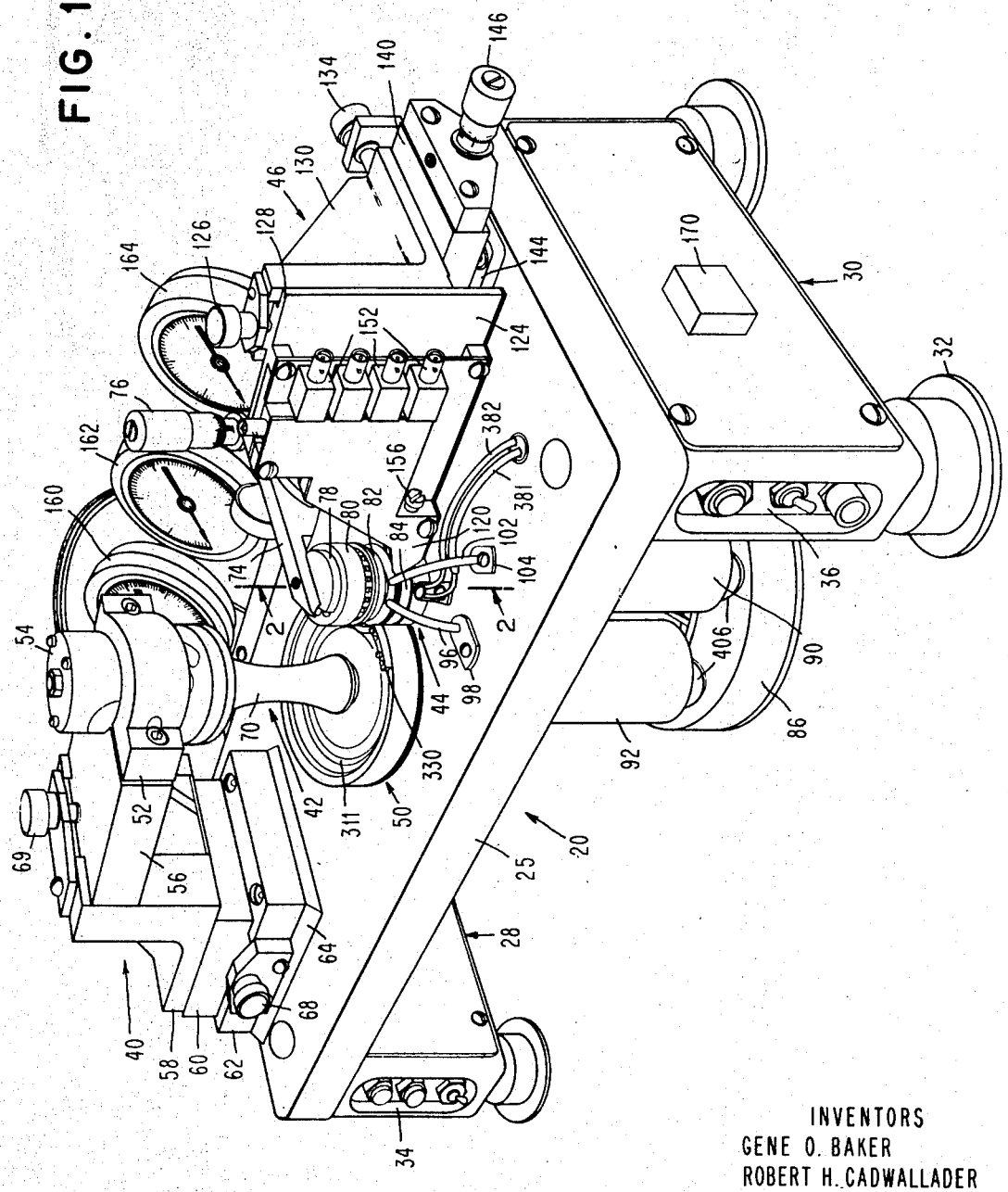
FIG. 1 is a perspective view of an exemplified form of the apparatus forming one aspect of the present invention.

FIG. 1 shows an overall perspective view of the preferred form of the apparatus forming one aspect of our invention. The apparatus may be designated generally as an automatic core handler, tester and/or sorter, and is denoted by reference numeral 20. The automatic core handler 20 comprises a horizontally disposed base 25 supported upon two leg assemblies 28 and 30. As will be seen, each leg assembly sits upon a pair of similar rubber feet 32 that are provided in order to isolate or damp vibrations. Each leg assembly 28 and 30 also houses the electrical circuitry of the machine and includes various controls such as control switches 34 on leg assembly 28 and control switches 36 on leg assembly 30.

Mounted on the base 25 of the machine 20 are four major assemblies, the feed bowl support assembly 40, the feed bowl assembly 42, the core handling assembly 44 and the contact head assembly 46. The feed bowl support assembly 40 is provided for supporting the feed bowl, generally designated by reference numeral 50. A clamp 52 mounts the vibrator motor 54 of the feed bowl assembly to a support arm 56. The support arm 56 is mounted in turn upon an upright, generally L-shaped support member 58 which is in turn mounted upon base members 60 and 62. The base member 62 is slidably mounted on ways 64, and the base member 60 is slidably mounted in base member 62. In addition, the arm 56 is slidably mounted on support member 58. In this manner, X, Y and Z motion is available to accurately position the feed bowl 50. X-axis bowl adjustment knob 68 and Z-axis bowl adjustment knob 69 are visible in FIG. 1.

The feed assembly 42 includes the aforementioned vibrator motor 54, the feed bowl 50 and in addition bowl stem 70. The feed bowl is a conventional vibratory feeder of the type well known to those skilled in the art. It has been modified, in the present machine 20, to have its bowl stem 70 and vibrator motor 54 above the bowl 50 rather than below as is usually the case. This relationship is desirable in order to have the feed bowl 50 as close as possible to the base 25 in order to prevent cores from entering the vibrator 54.

The core handling assembly generally designated by reference numeral 44 includes a cam support arm 74, supported at its outboard end adjacent base 25 on an adjustable mount (not illustrated) to which an adjustment means 76 is connected. On the inboard end of the arm 74 there is mounted an overhead cam 78 that is provided for a purpose to be more thoroughly discussed hereinafter. Below the cam 78, and supported from below is a test probe guide ring 80, test probe barrel 82 and a transfer wheel 84. As will be explained later, the transfer wheel 84 and barrel 82 are mounted on the output shaft of a motor, not shown in this view, that is mounted below base 25. In FIG. 1, there is shown a portion 86 of the motor housing which also serves as a seat for core receiving accept and reject vessels, respectively 90 and 92. Associated with the core handling assembly 44 are a reject tube 96 and its support or mount 98, and an accept tube 102 and its support or mount 104. Also associated with the core handling assembly 44 are a pair of blowoff tubes 381 and 382 to be mentioned again below.

The contact head assembly 46 is, similarly to the feed bowl support assembly 40, movable in X, Y and Z directions upon ways. The contact head assembly 46 includes the contact head 120, carried upon an upright movable plate 124. The plate 124 is vertically adjustable by Z-axis adjustment knob 126, and is mounted upon ways 128 forming a portion of L-shaped support member 130. Support member 130 is adjustable in the Y direction by Y-axis adjustment knob 134, being movably mounted upon base support 140. Base support 140 is mounted upon ways 144 on the base 25 and is movable in the X direction by X-axis adjustment knob 146. Adjacent to the contact head 120 are four coaxial connector members 152. Also visible in the overall view of FIG. 1 is a transformer adjustment screw 156 that will be described more fully hereinafter, as well as pressure gages 160, 162 and 164, all forming a portion of the fluidic operating and control system of the present machine. Also visible in FIG. 1 and comprising a portion of the fluidic control system is an electric-to-fluidic transducer 170 mounted on leg assembly 30.

CORE HANDLING ASSEMBLY

Figure 2:
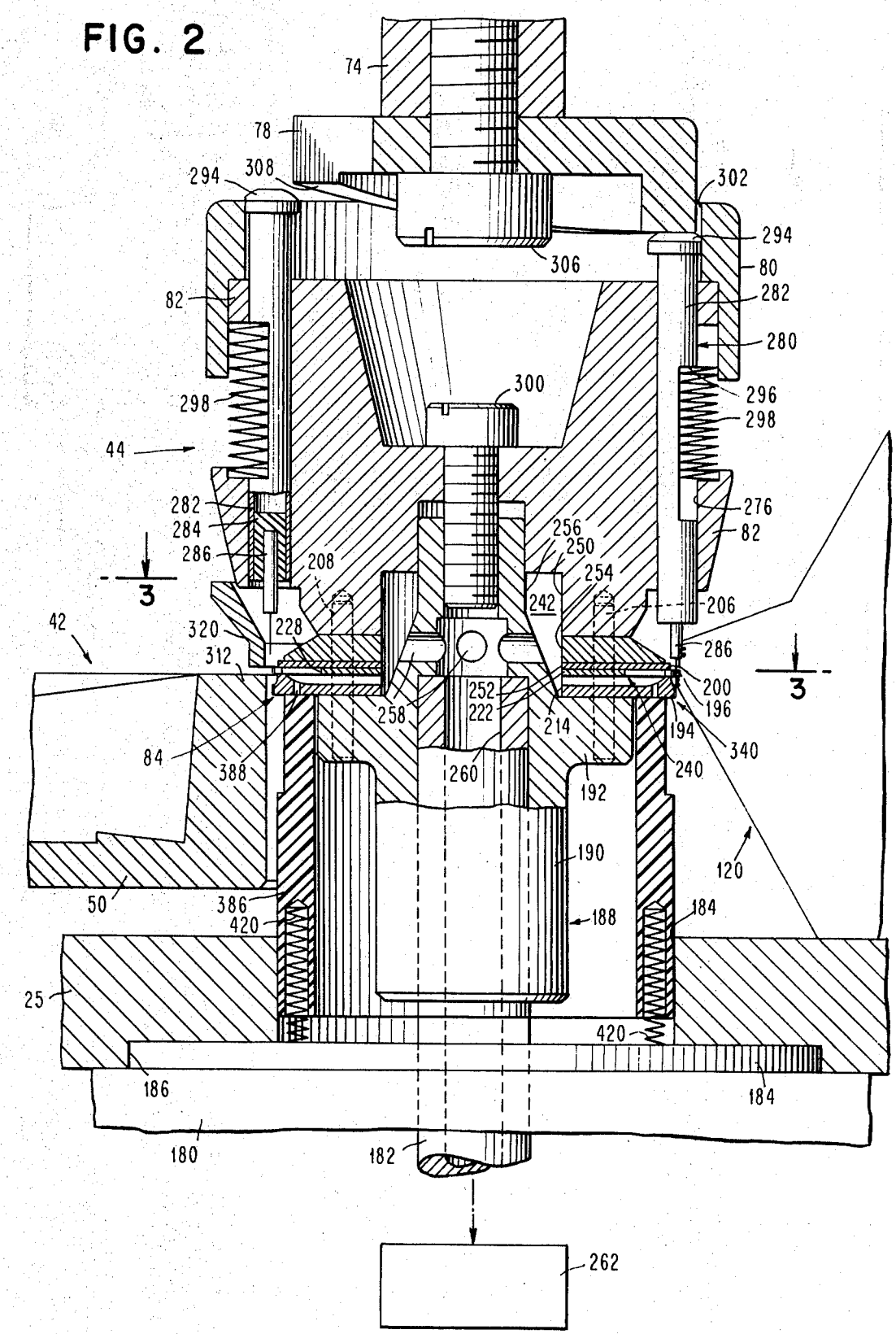
FIG. 2 is an enlarged vertical sectional view taken substantially on the plane of the line 2–2 in FIG. 1.

Having now generally described the various assemblies of the machine 20, shown in FIG. 1, reference should now be had to FIG. 2 which is a vertical cross section through the core handling assembly 44, also encompassing portions of the feed bowl assembly 42 and contact head assembly 46. As previously mentioned, it will be noted that the motor 180 is mounted below base 25, with motor shaft 182 extending upwardly above base 25 through an opening 186 in the base. The motor 180 is connected to the underside of the base 25 by key 184 in keyway opening 186.

In order to mount the transfer wheel 84 and barrel 82 upon shaft 182 as previously mentioned, a support or mount member 188 having a body portion 190 and a supporting or flange portion 192 is fixed to the shaft. The aforementioned transfer wheel 84 encompasses, in the exemplified embodiment, several elements which may be seen not only in FIG. 2 but also for example in FIGS. 4 and 5. The mount flange 192, a platform 194, a pickup shim or plate 196, a clamp washer 200 and a clamp plate 204 essentially comprise the transfer wheel 84 but it could, if desired, have more or fewer elements. For example, flange 192 might be extended up and machined to provide the elements and function of the wheel, as will be explained later. In this embodiment, however, the platform 194 is seated upon the upper flat surface of the flange 192 and slip fit upon a pair of dowel pins 206 and 208 as will be seen for example in FIGS. 2 and 7. Also mounted on the dowel pins 206 and 208 are the pickup plate 196, clamp washer 200, clamp plate 204 and the previously mentioned test probe barrel 82.

FIG. 7 is an exploded perspective view that shows the platform 194 to be an annular member having a pair of pin receiving holes 210 and 212 for mounting the platform upon the dowel pins 206 and 208 respectively. The platform 194 also has a central opening 214 and a plurality of channels or grooves (20 in the exemplification) 220 that open to or communicate with the central opening 214 and extend radially outwardly, but terminate short of the periphery of the platform. The pickup plate 196 also is an annular member having a central opening 222, a pair of mounting holes 224 and 226 and, in the exemplified embodiment, 20 generally V-shaped notches or vacuum pockets 232 open to the periphery of the plate with each pocket being connected at its inner end by connecting slots 230 to an elongate hole 228 in plate 196. The washer 200 is a spherical, annular member that is provided for clamping plate 196, by means of clamp plate 204, tightly against plate 194.

It will be noted, especially in FIGS. 2, 4, 5, 7 and 8, that each channel 220 in platform 194 is contiguous along at least part of its length with one elongate hole 228 and slot 230 in plate 196. Also, that the peripheral vacuum pockets 232, together with slot 230, hole 228 and channel 220 comprise 20 vacuum channels or passages 240, formed in members 194, 196 and 200. The vacuum passages 240 from a central vacuum manifold 242 to the peripheral edge of the pickup wheel 84 and terminate in the twenty pickup means or vacuum pockets 232. It will also be noted that the 20 vacuum pockets 232 are equally spaced (every 18°) about the periphery of the transfer wheel 84.

The vacuum manifold 242 is formed by a cutout portion 250 in the barrel 82 together with the annular openings 214 and 222 in platform 194 and pickup plate 196 respectively. The openings 252 and 254 in clamp washer 200 and clamp 204 respectively, and the outer periphery of an upper stem portion 256 of mount 188 complete manifold 242. The mount 188 includes four equally displaced passages or ports 258 that open to the manifold 242 and to a vacuum passage 260 within the motor shaft 182. This vacuum passage 182 is connected ultimately to a vacuum pump 262 shown schematically in FIG. 2 for example. Thus, it will be appreciated that when a vacuum is drawn by vacuum pump 262, the vacuum manifold 242 will operate to draw a vacuum through the twenty vacuum passages 240 forming, in effect, twenty equally spaced vacuum pockets or pickup means about the periphery of the transfer wheel 84.

As mentioned previously, the barrel 82 is mounted upon dowel pins 206 and 208 and hence rotates together with the transfer wheel 84 and its associated elements including wheel mount 188 as motor shaft 182 is rotated. In the exemplification, the motor 180 is a stepping motor that steps in 18° increments, since there are 20 vacuum pickup pockets in the transfer wheel 84. The barrel 82, as shown in particular in FIG. 7, has twenty vertical probe receiving chambers 270 comprising an upper flange with its openings 272, an exposed portion having channels 274 and a lower flange with its openings 276. In each probe receiving chamber 270 there is disposed a test probe assembly 280 that, upon reference to FIGS. 2 and 5, will be seen to include a probe housing 282, an insulating sleeve 284, a probe body 286, a probe tip 281 and an insert 288 insulated from the probe body and tip by a layer of insulation 290. Each probe housing includes an upper cam follower head 294. The housing 282 has a cutout portion 296 for receiving a probe return spring 298 that normally biases the probe housing upwardly within the barrel 82. The probe barrel 82 is mounted upon the stem portion 256 of mount 188 by a mounting nut 300 as is shown in FIG. 2.

In order to operate the probe assemblies 280, or to cause them to reciprocate as the motor shaft 182 and probe barrel 82 revolve, the previously mentioned cam 78 is mounted immediately above, and partly within an opening 302 in probe guide ring 80. The guide ring 80 is seated upon the probe barrel 82 for preventing the test probes from rotating during their reciprocatory motion, that is provided by reciprocation means including cam 78 and return springs 298. The cam 78 is fixedly mounted immediately above the rotatable probe barrel 82 upon arm 74 by mounting nut 306. The cam 78 has a downwardly facing cam track or surface 308 against which the cam follower heads 294 ride in contact over a preselected portion of their rotation. As will be seen in particular in FIGS. 1 and 2, the cam extends over approximately 270° of the probe guide ring 80 and barrel 82, leaving a portion thereabove open for ease of extraction of the probe assemblies 280, if so desired. This provides a convenient way of removing defective or warn probe assemblies, i.e., merely by removing their spring 298 and lifting the assembly upwardly out of the probe barrel 82.

FEED BOWL ASSEMBLY

Figure 3:
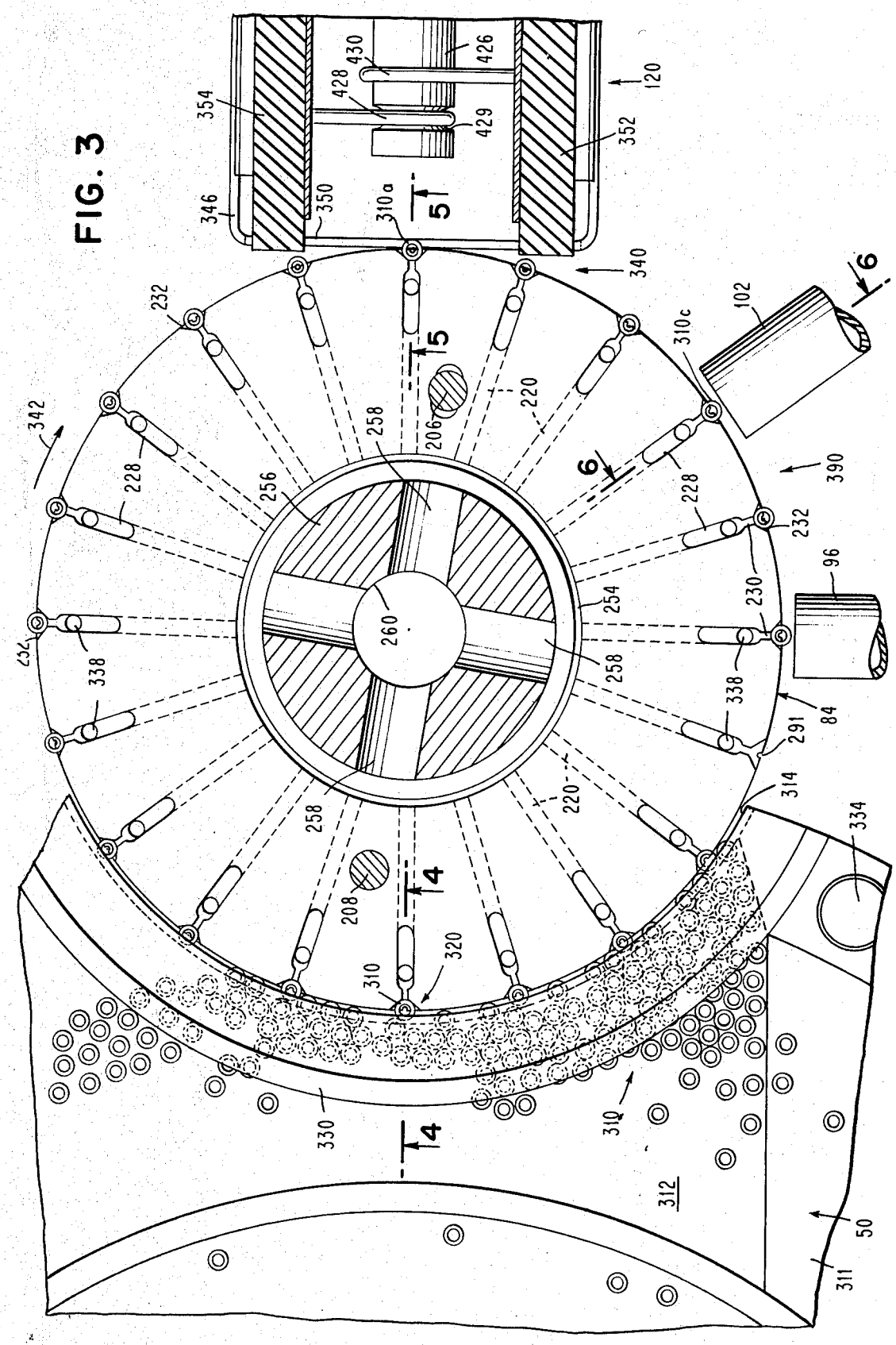
FIG. 3 is a still further enlarged sectional view taken substantially on the plane of the line 3–3 in FIG. 2.

Since the objective of the machine 20 is to individually test magnetic cores at a high rate of speed, the vibratory feed bowl 50 provides a means for conveying a plurality of the cores substantially simultaneously to a pickup station 320 (FIG. 3). This overcomes a major impediment to high speed present in the prior art, i.e., serial or single-file core feeding and/or pickup. At the pickup station 320, in the exemplification, is an arcuate recess or cutout 314 in bowl 50 of feed bowl assembly 42. The bowl 50 has the usual ramps 311 that feed the cores by vibratory motion to a flat feed or transfer area 312, that is adjacent the recess 314. In the recess 314 is located a sector of the transfer wheel 84, as will be best seen in FIG. 3. In the exemplification, this sector is approximately 110°, thereby including six vacuum pockets 232. Of course, as previously explained, the motor moves the transfer wheel in 18° steps, and while six vacuum pockets are always present at pickup station 320, a new, or empty, pocket 232 is presented to station 320 by each step.

Figure 4:
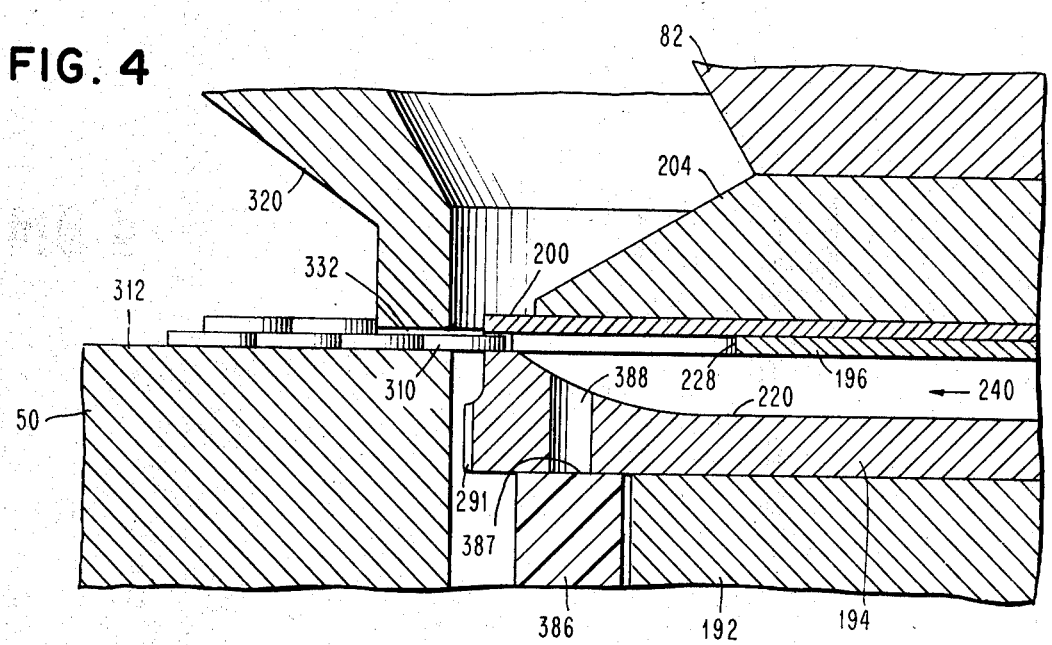
FIG. 4 is a sectional view taken substantially on the plane of the line 4–4 in FIG. 3.

In order to prevent the vacuum pockets 232 from attracting and possibly picking up more than one core, means for preventing stacked cores from reaching the pockets is provided. This means is an arcuate gate 330 (FIGS. 3 and 4) mounted on bowl 50 adjacent recess 314. Gate 330 is mounted as indicated at 334, and spaced throughout a major portion of its length from feed area 312 to form a long arcuate slot 332 having a height greater than one core, but of course less than the height of two stacked cores. This prevents stacked cores from entering pockets 332, as shown in FIG. 4.

CONTACT HEAD ASSEMBLY

Figure 5:
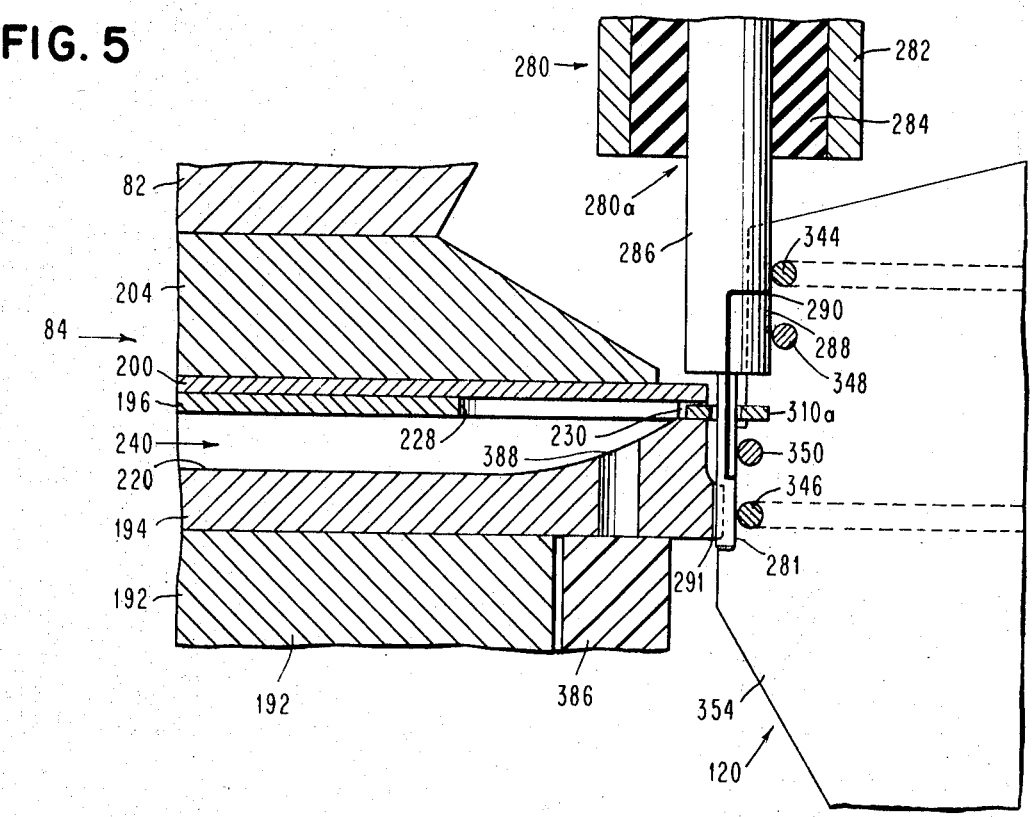
FIG. 5 is a sectional view taken substantially on the plane of the line 5–5 in FIG. 3.
Figure 8:
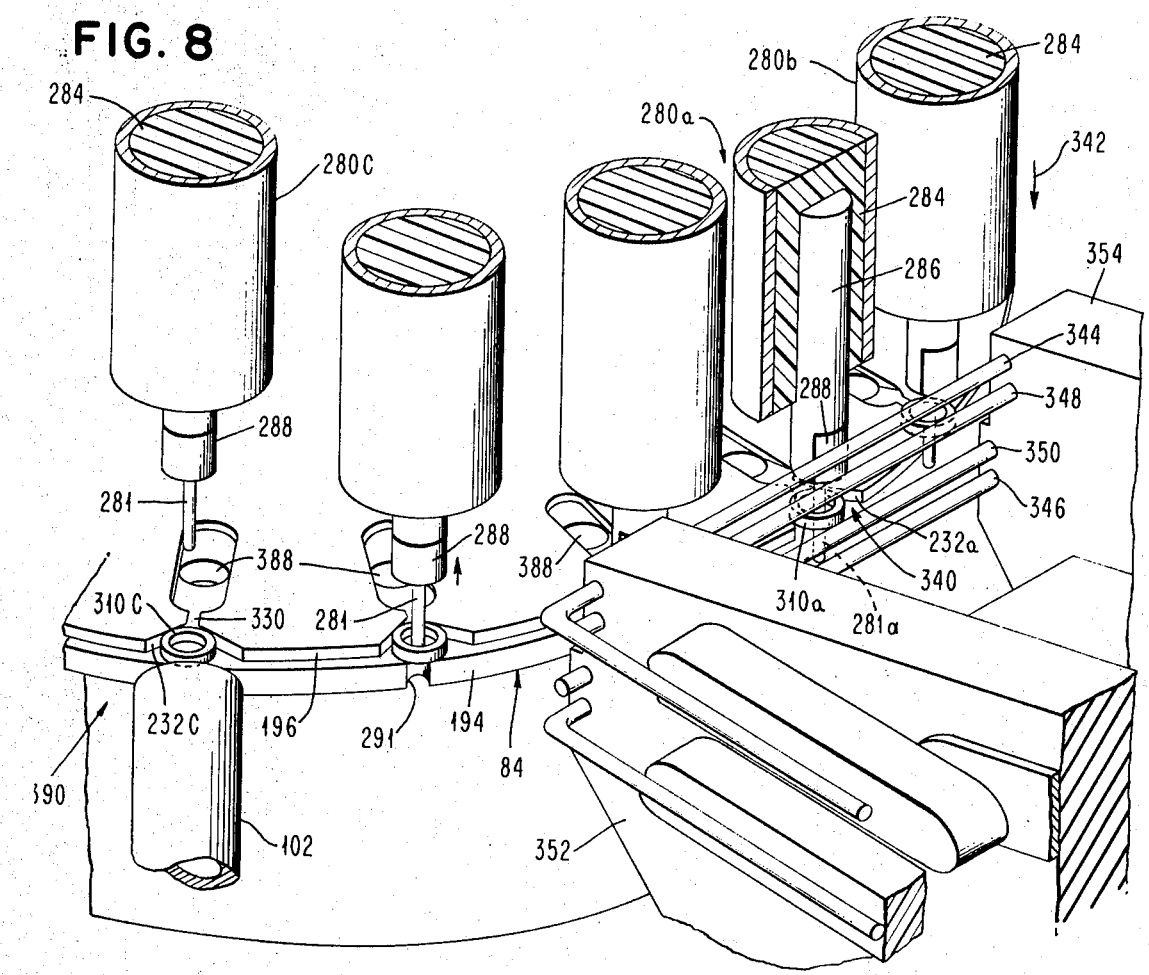
FIG. 8 is a perspective view with portions of the apparatus removed in order to illustrate the manner in which cores are tested at the test station and sorted out at the sorting station of the exemplified apparatus.

For ease of access to cores carried in the wheel's vacuum pockets 232, the contact head 120 is mounted adjacent the periphery of transfer wheel 84 at a test station 340. The head 120, as shown in FIGS. 3, 5 and 8 carries four electrical contacts, outer and inner sense line contacts 344 and 346, and outer and inner drive line contacts 348 and 350. All these contacts are disposed generally tangentially to the transfer wheel 84 and probe barrel 82 so that the engagement between probes 280 and the contacts is a sliding or wiping engagement between one surface of the probes and contacts.

The probe body 286 forms a path of conduction and completes a circuit between contacts 344 and 346, and the insert 288 does the same for contacts 348 and 350. Thus, with a probe 280 in the position shown in FIGS. 5 and 8, tests upon a core are conducted, as will be explained hereinafter.

Each of the contacts 344, 346, 348 and 350 is mounted between arms 352 and 354 of head 120, and connected in a suitable manner to appropriate test circuits, such as are shown in the aforementioned patents. The accessible position of the contacts in arms 352 and 354 facilitates their replacement when worn. This aids in the easy maintenance of machine 20. The particular relationship of the contacts 344—350 with respect to the probe barrel 82 and probes 280 also provides a most desirable feature; i.e., make-before-break engagement, that substantially eliminates contact bounce. Thus, in operation, with the probe barrel 82 rotating, before one probe (280a in FIG. 8) becomes disengaged from contacts 344—350, but after the core 310a is tested, probe 280b picks up or engages the contacts. This prevents undue bounce or vibration of the contacts, i.e., transverse movement of the contacts between engagements with adjacent probes, and enables a smooth transition between test probe movements. It also contributes to vibration-free operation of machine 20 and reduced maintenance and replacements of the machine components as tool wear is, to a great extent, inhibited.

Figure 9:
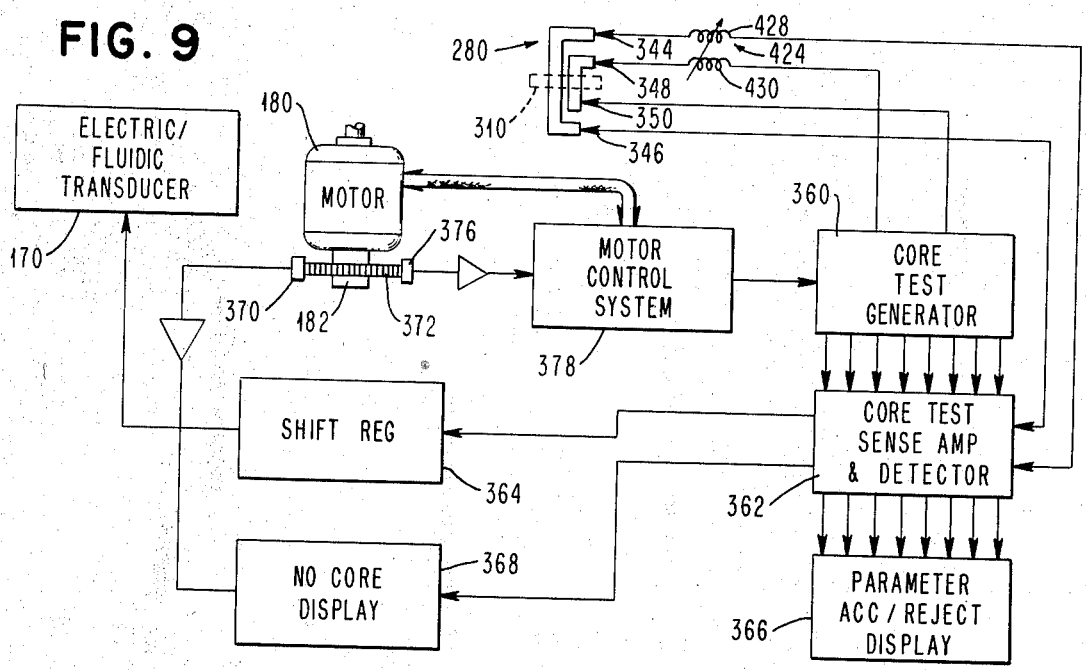
FIG. 9 is a schematic illustration of the test circuitry employed in the practice of the present invention.

A noise decoupling transformer 424 forms part of the test station components, and more specifically a portion of the contact head 120. As shown schematically in FIG. 9, as well as in FIG. 3, an adjusting post 426, that is accessible by the adjusting screw 156 shown in FIG. 1, has oppositely wound, single turn coils 428 and 430 connected to contacts 344 and 348 respectively. The coils are oppositely wound as shown by the dot convention in FIG. 9. In order to adjust the transformer, it is merely necessary to turn the adjusting screw 56 which will force coil 428 carried in groove 429 toward or away from coil 430. Thus, there is a built-in, readily adjustable noise decoupling means in contact head 120.

OPERATION

Having described the major assemblies of the machine 20 in detail, the operation of the apparatus will now be explained. It will be seen in various figures of the drawings that a plurality of magnetic elements, in this case annular magnetic cores 310, are fed by the feed bowl 50 in accordance with its usual manner of operation, i.e., by vibration, to the flat feed area 312 adjacent the pickup station 320. It is at this area 312 that the cores 310 are transferred from the vibratory feed bowl 50 and picked up in the pickup means (vacuum pockets 232) of the transfer wheel 84.

As previously mentioned, the motion of the motor shaft 182 is an incremental motion which, in the exemplification, takes approximately 7 milliseconds from start to stop. By virtue of the availability of a plurality of the cores 310 at the pickup station 320 at all times, and the continuous presence of a sector of the transfer wheel 84 having a plurality of vacuum pockets (six in the present embodiment), the transfer or pickup of cores from feed bowl 50 to transfer wheel 84 is essentially on a parallel rather than on a serial basis. It will be appreciated that at any instant, there are a plurality of potential vacuum pockets for attracting cores at the pickup station 320. In this manner, it has been found that cores may be tested as fast as it is desirable to have the transfer wheel 84 rotate. It will be appreciated that the motion of the wheel 84 is a stepping motion since it is desirable to have the cores stationary during test, and not due to any limitation as to the pickup or transfer of cores from feed bowl 50 to vacuum pockets 232, which can and do pick up cores while wheel 84 is moving. Additionally, it will be understood that other means may be provided for rotating the wheel 84, e.g. a geneva mechanism.

The specific operation of machine 20 may be best appreciated by viewing FIGS. 3, 4, 5, 6 and 8 together. As the transfer wheel 84 rotates, it initially picks up a core, 310a for example, from the mass or plurality of cores present at flat area 312 of bowl 50. Core 310a is carried in its vacuum pocket 232a in the direction indicated by arrow 342 from pickup station 320 to the test station 340 as wheel 84 rotates in steps. The test probe, designated 280a, associated with pocket 232a is carried in barrel 82 with wheel 84 and gradually forced by cam 78 downwardly so that the probe 280a is driven or inserted axially through the center of the opening in the core 310a. The probe tip 281a is received within an insulated channel 291 in platform 194 and is located very exactly at the radial center of the core. With the probe in its downwardly most position as shown in FIGS. 5 and 8, electrical contact is made between contacts 344 and 346 and between 348 and 350, and tests are carried out. In the exemplification, the motor 180 and hence the probe barrel 82 and transfer wheel 84 are at rest during test. It is important to note that probe and contacts engage each other only on one surface or face in a sliding type action. This reduces the wear factor present in prior art arrangements where the probe movably slipped between and forced apart two adjacent contacts and hence was worn on both sides. The new embedded insert configuration of the present probes permit this action.

Appropriate test pulses, as explained in the above-mentioned patents, are generated by the core test generator 360 (FIG. 9) and the test pulses are sensed by a core test sense amplifier and detector 362. As will be seen in FIG. 9, the electrical contacts 344, 346, 348 and 350 are shown schematically in relationship to a test probe assembly 280, with the core 310 in test position. When the test has been completed, the results from test sense amplifier and detector 362 are stored in a shift register 364 and shown visually at an appropriate parameter accept/reject display means 366, that may be any conventional display, of the digital type, for example. The core test sense amplifier and detector 362 also outputs to a no-core display means 368, that also receives input signals from a magnetic pickup 370 used to provide input information to the display means 368. The magnetic pickup 370 is disposed adjacent a toothed wheel 372 carried on the motor shaft 182. The wheel 372 has 20 teeth, corresponding to the 20 vacuum pockets 232, and the magnetic pickup 370 is disposed to sense the position of a single predetermined vacuum pocket. In this manner, a no-core indication can be synchronized with the specific probe 280 that has failed to test the core, due to failure of a vacuum pocket 232 to pick up a core. The no-core display thereby provides a diagnostic indication for operating personnel.

A second magnetic pickup 376 is also disposed adjacent the wheel 372. The pickup 376 senses all 20 teeth on the wheel, and has an output connected to a motor control system 378. The magnetic pickup 376 is used to sense if the wheel 372 is in correct position, for if it is, a core test cycle is initiated. On the other hand, if the magnetic pickup 376 senses that the wheel 372, and hence the motor shaft 182, probe barrel 82 and transfer wheel 84, are in incorrect position, as for example, out of phase, the core test cycle will be inhibited and a correction step will be applied to the motor 180 by motor control system 378. In this manner, it is assured that core tests are carried out only when a core is actually present at the test station 340, and only when the vacuum wheel 84 and probe barrel 82 are accurately positioned with respect to the contacts 344-350.

It will be understood that each core 310 is picked up and carried by the vacuum applied to pockets 232 from pickup station 320 to and through test station 340. Each probe associated with a pocket is moved by cam 78 into the hole within a core, and then lifted therefrom within two to three steps of the wheel 84 and barrel 82. This action is shown in FIG. 8.

In order to sort the cores after they have been tested at station 340, as noted previously, the test results are stored in register 364. Continued rotation of motor shaft 182 carries the tested cores in 18° increments to a sorting station 390, where accept and reject tubes 102 and 96 are located. The shift register 364 is connected to an electric-to-fluidic transducer 170 that may be any conventional type. Transducer 170 converts electric pulses, as supplied by the shift register 364, to fluidic output pulses. The transducer 170 is connected to the blowoff tube 382 (FIGS. 1 and 6) that is carried in a nonrotating sleeve 386 mounted within opening 184, around shaft 182 and mount 188. The blowoff tube 382 is open at its upper end for communication with blowoff passages 388 that are present in platform 194 and connect to each vacuum passage 240. This relationship may be readily observed in various of the FIGS., including FIGS. 2, 5 and 6. The sleeve 386 is mounted on springs 420 so that it "floats" in opening 184 in order to provide a seal for the blowoff passages 388 over a major portion of their movement. The upper surface 387 of sleeve 386 thus ordinarily seals passages 388, thereby retaining the vacuum in passage 240. Only when a blowoff passage 388 communicates with blowoff tube 386 (FIG. 6) does the passage 388 become operative.

Figure 6:
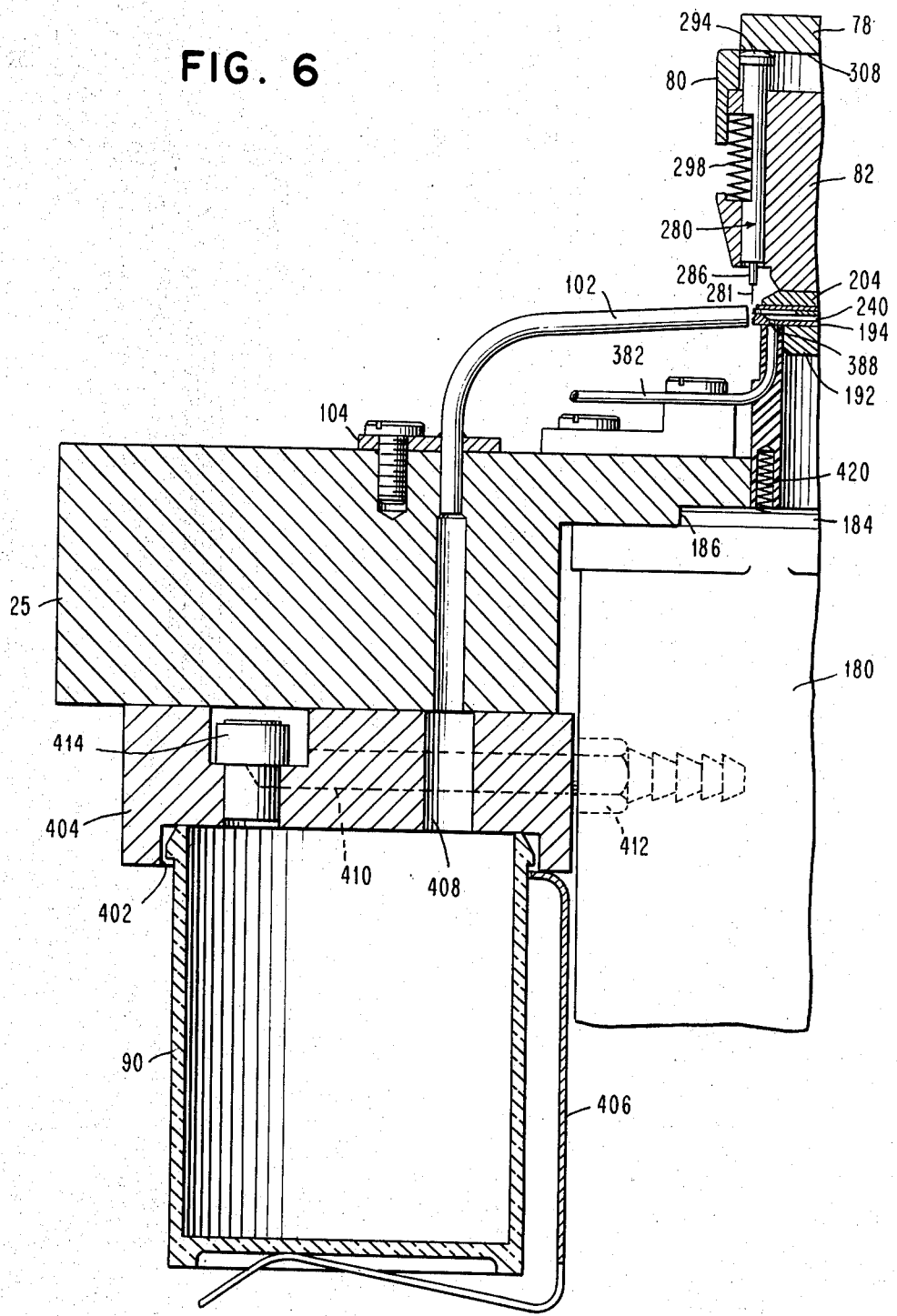
FIG. 6 is a sectional view taken substantially on the plane of the line 6–6 in FIG. 3.

In order to eject a tested core 310 from its vacuum pocket 232, if the test circuitry has determined it to be an acceptable core, an electrical pulse is applied to the transducer 170 by the shift register which is timed to do so when the transfer wheel 84 has moved three steps from the test station 340. Referring to the test probe assembly 280C in FIG. 8, and assuming that magnetic core 310C was an acceptable core, that test probe assembly and core have moved in three steps from test station 340 to sorting station 390. During this rotation, the cam 78 permits the test probe assembly to be raised, with the probe tip being removed from the core, and of course, a following probe picking up the contacts 344—350 before they are permitted to bounce or vibrate. When the vacuum pocket 232C carrying the core 310C reaches the accept tube 102, the probe is upwardly out of the way, being driven to that position by its return spring 298, and the blowoff passage 388 is in communication with the blowoff tube 382. A pulse of air at this time from transducer 170 is applied to overcome the vacuum in vacuum passage 240 that is holding the core in the vacuum pocket 232C. This ejects the core 310C into accept tube 102, but does not disturb the vacuum holding other cores in their pockets 232 since the air pulse pressure is relatively low. The core 310C thus tested and sorted as an acceptable core falls through the accept tube 102 into an accept vessel 90 mounted beneath the base 25 as shown in FIGS. 1 and 6.

In order to receive cores, the vessel 90 is removably mounted in an opening 402 in a mounting block 404 under the base 25 by a mounting clip 406 and is in direct communication with an accept port 408 in the mounting block 404. Port 408 is in turn in direct communication with the accept tube 102. The acceptable core 310C that was ejected from its vacuum pocket 232C in the transfer wheel 84 is thereby conveyed to the accept vessel 90. Since a positive pressure would be built up in the accept vessel 90 as more cores are transferred in this manner, it is necessary to relieve the pressure or otherwise the vessel 90 would resist the receipt of additional cores. Accordingly, a vacuum bleed passage 410 in mounting block 404 connects to a vacuum fitting 412. In this fashion, passage 410 is connected by suitable hoses (not shown) to the aforementioned vacuum pump 262 or to some other vacuum source to draw a vacuum in vessel 90 and prevent its becoming pressurized. In the vacuum bleed passage 410 there is mounted a filter means 414 having a filter screen therein (not illustrated) that prevents the sorted cores in accept vessel 90 from being drawn into the bleed passage 410, while also screening out foreign particles and dust that may otherwise be conveyed into the vacuum system.

While we have discussed the manner of ejecting an acceptable core from its vacuum pocket, the sorting of cores by machine 20 is predicated upon the ability to separate acceptable and unacceptable cores, i.e., cores having acceptable and unacceptable magnetic or electrical characteristics. If a core tested at test station 340 proves to be unacceptable, the core test sense amplifier and detector means 362 does not supply a signal to shift register 364, which of course then does not actuate the transducer 170 when that core is present adjacent accept tube 102. In this manner, an unacceptable core will not be ejected from its vacuum pocket into tube 102. However, when a core is carried to a point adjacent the eject tube 96 it will be removed or ejected from its vacuum pocket since there is a positive source of air applied by the other blowoff tube 381 to the underside of the platform 194 and hence through the blowoff passages 388 reaching that position. It will be appreciated therefore that this invention includes a "fail-safe" sorting system, with accept cores being ejected from the transfer wheel 84 only when the transducer 170 is signalled, and with all cores otherwise being ejected into eject tube 96 if they still remain in the transfer wheel 84. The openings 422 and 424 in sleeve 386 (FIG. 7) are provided for receiving the blowoff tubes 382 and 381.

As mentioned, sleeve 386 forms a seal for passages 388 below each channel 220 in the platform 194, as otherwise the vacuum to pockets 232 would be ineffective. Sleeve 386 floats upon its mounting springs 420 so that it can follow any irregular movement or wobble of the core wheel 84 during its motion. In this manner, a continuous seal for the blowoff passages 388 is assured. However, since the sleeve 386 must be free to float within the opening 184 in base 25, it has a tendency to be rotated by the friction between its surface 387 and the bottom surface of the platform 194. This tendency to rotate is prevented by the location of the two blowoff tubes 382 and 381 in their slots 422 and 424 in the sleeve.

It is believed that the foregoing description of the apparatus and method for testing, handling and/or sorting miniature magnetic cores shows the present invention to be truly novel and unique. The actual apparatus has achieved a machine throughput of 100 cores per second or more. This, of course was previously not only unobtainable but actually unimaginable to those skilled in the art; i.e., those using conventional core handlers. Further, this apparatus is capable of handling miniature, e.g., so-called 8—13 cores (i.e., .008 inch inner diameter; .013 inch outer diameter) or either smaller or larger cores with extreme accuracy and at the speeds mentioned above.

Besides tremendous speed and ability to handle very small cores, the present apparatus and method have other heretofore unobtainable advantages. Thus, for example, it is quite easy to change the core type that is to be handled by the apparatus since the core handling assembly 44 is so accessible and easily dismantled. In order to change core types, it is merely necessary to change pickup plate 196 so that its vacuum pockets will accommodate the different size cores. Also, it is necessary that the probe assemblies be changed, but this is easily done, merely by removing the cam 78 and lifting the probe assemblies upwardly out of the probe barrel 82. The return springs 298 are readily removable from their seats, and everything about the placement of parts in the apparatus is directed towards ease of removal and/or replacement.

While we have shown the preferred or exemplified embodiment of the apparatus, modifications that fall within the spirit and scope of the invention will become apparent to those skilled in the art. Thus, for example, while we have the floating sleeve 386 to be a plastic material in order to reduce friction between the upper sealing surface 387 of the sleeve 386 and the under surface of the platform 194, it will be apparent that other parts of the apparatus may be made of lighter material such as plastics in order to reduce the mass and to enable faster motor response. Further, while we have shown 20 pickup means or vacuum pockets in wheel 84, it is possible to have either greater or fewer pockets. We have, for example, also constructed a quality control model having only five pickup pockets disposed equally about the transfer wheel 84. Further, it is contemplated that a transfer wheel having 25 or more pickup means would be feasible, and, in such case while the stepping motor operation would have to be modified to provide smaller angles between the steps, this could easily be done, and would result in an even greater throughput or speed for the apparatus.

While we have shown a plurality of test probes, in fact, one for each pickup means or vacuum pocket 232, it would be possible to have a single test probe present at the test station 340 entirely separate from the transfer wheel 84 with appropriate means for reciprocating the core test probe. This reciprocation would have to be coordinated with the stepping motion of the transfer wheel 84, but this could easily be accomplished. As a matter of fact, this concept was initially contemplated, but it was felt that the present version of the apparatus is more feasible as the tool wear is more favorable and accurate alignment of multiple probes with cores is better with the preferred embodiment.

In conclusion, it will be understood that various other omissions and/or substitutions or changes in form and details of the device and in its operation may be made by those skilled in the art without departing from the true spirit of the invention. It is accordingly desired that the appended claims shall not be limited to any specific details thereof.

We claim:

1. Apparatus for testing miniature magnetic cores at very high rates of speed, comprising:
means for conveying a plurality of miniature magnetic cores to a pickup station having a generally arcuate recess;
transfer means generally conforming to said arcuate recess at said pickup station for receiving a plurality of the magnetic cores substantially simultaneously;
a testing station;
means for moving said transfer means and thereby carrying said magnetic cores from the pickup station to the testing station; and
means at said testing station for testing the magnetic characteristics of said magnetic cores while they are held in said transfer means.

2. The apparatus of claim 1 wherein said transfer means includes a plurality of individual pocket means for receiving the magnetic cores, with at least two of the pocket means being present at the pickup station simultaneously.

3. The apparatus of claim 2 including: a sorting station having accept and reject means for receiving said magnetic cores, and means for selectively ejecting said magnetic cores from said pocket means into said accept and reject means.

4. The apparatus of claim 2 wherein said testing means includes a plurality of electrical contacts located at the testing station adjacent the path of travel of said transfer means, a plurality of probe means corresponding in number to said pocket means and arranged for insertion into each said magnetic core and thereby into engagement with said electrical contacts, and test circuit means connected to said electrical contacts for performing predetermined tests upon a magnetic core while it is located at said testing station.

5. Apparatus for testing magnetic cores, comprising:
means for conveying a plurality of magnetic cores to a pickup station, said conveying means including a vibratory feeder having a bowl, with said bowl including a recess therein;

transfer means at the pickup station comprising a rotatable wheel having a sector located within said recess, said sector having at least two pocket means for receiving magnetic cores whereby a plurality of magnetic cores are present to feed said pocket means and a plurality of pocket means are present for receiving said magnetic cores;

a testing station;

means for moving said transfer means thereby carrying said magnetic cores to the testing station; and means at said testing station for testing the magnetic characteristics of said magnetic cores while they are held in the transfer means.

6. The apparatus of claim 5 wherein said wheel comprises a rotatable assembly having a centrally located vacuum manifold, and including plate means having a plurality of passages extending from said vacuum manifold with each leading to one said pocket means whereby said pocket means will contract and hold magnetic cores.

7. The apparatus of claim 5 wherein said testing means includes a plurality of electrical contacts arranged adjacent the path of travel of said rotatable wheel, a test probe carrier arranged for movement by said moving means and thereby with said rotatable wheel, a plurality of test probes carried by said probe carrier, and means for inserting a test probe into a magnetic core at said test station and into engagement with said electrical contacts whereby predetermined tests may be performed upon the magnetic core.

8. Apparatus for testing the characteristics of magnetic elements comprising:

a transfer wheel having a plurality of pickup cavities exposed at the periphery of said transfer wheel;

means for incrementally rotating said transfer wheel;

feeding means for conveying a plurality of said magnetic elements to a pickup station having an arcuate recess receiving an exposed sector of said transfer wheel wherein a plurality of said magnetic elements are transferable from said feeding means to a plurality of said pickup cavities;

a test station having a plurality of electrical contacts disposed adjacent said transfer wheel;

at least one test probe; and means for moving said at least one test probe into test position relative to a magnetic element and into engagement with said electrical contacts while a magnetic element is at said test station whereby said magnetic elements may be individually tested.

9. Apparatus for testing the characteristics of magnetic elements comprising:

a transfer wheel having a plurality of pickup cavities exposed at the periphery of said transfer wheel;

means for rotating said transfer wheel;

feeding means for conveying a plurality of said magnetic elements to a pickup station where a sector of the periphery of said transfer wheel is exposed wherein a plurality of said magnetic elements are transferable from said feeding means to a plurality of said pickup cavities;

a test station having four electrical contacts disposed adjacent to said transfer wheel;

at least one test probe including a probe body for engaging first and second of said four electrical contacts and insert means insulated from said probe for engaging third and fourth of said four electrical contacts; and means for moving said at least one test probe into test position relative to a magnetic element and into engagement with said electrical contacts while a magnetic element is at said test station whereby two separate tests may be performed substantially simultaneously upon a magnetic element.

10. Apparatus for testing the characteristics of magnetic elements comprising:

a transfer wheel having a plurality of pickup cavities exposed at the periphery of said transfer wheel;

means for rotating said transfer wheel;

feeding means for conveying a plurality of said magnetic elements to a pickup station where a sector of the periphery of said transfer wheel is exposed wherein a plurality of said magnetic elements are transferable from said feeding means to a plurality of said pickup cavities;

a test station having a plurality of electrical contacts disposed adjacent said transfer wheel;

a plurality of test probes disposed in a probe wheel arranged for rotation by said rotating means; and means for moving said test probes including cam means arranged to move said probes from an inoperative position at said transfer station to an operative position at said testing station as said rotating means rotates said pickup wheel and said probe wheel.

11. Apparatus for testing the characteristics of magnetic elements comprising:

a transfer wheel having a plurality of pickup cavities exposed at the periphery of said transfer wheel;

means for rotating said transfer wheel;

feeding means for conveying a plurality of said magnetic elements to a pickup station where a sector of the periphery of said transfer wheel is exposed wherein a plurality of said magnetic elements are transferable from said feeding means to a plurality of said pickup cavities;

a test station having a plurality of electrical contacts disposed substantially tangentially to the outer periphery of said transfer wheel;

a plurality of test probes movable with said transfer wheel and arranged adjacent corresponding pickup cavities in said transfer wheel; and means for moving said test probes into test position relative to a magnetic element and into sliding engagement with said electrical contacts along only one surface thereof while a magnetic element is at the test station whereby said magnetic elements may be individually tested.

12. Apparatus for sorting toroidal magnetic elements having a central opening comprising:

conveying means for feeding magnetic elements to a pickup station having a feed slot substantially wider than the diameter of a magnetic element whereby a plurality of the magnetic elements are fed substantially simultaneously through said feed slot;

transfer means disposed adjacent said feed slot, said transfer means having a plurality of receiving means for picking up said magnetic elements as they are fed through said feed slot, with at least two of said receiving means being present at said pickup station at all times;

a test station having means for testing the preselected parameters of the magnetic elements;

test probe means;

means for rotating said transfer means whereby magnetic elements picked up by said receiving means are carried to said test station;

means for introducing said test probe means into the central opening of a magnetic element at least while a magnetic core is at said test station whereby testing of the magnetic element for preselected parameters may be accomplished; and means for sorting the magnetic elements in response to the results of the tests performed at said test station.

13. The apparatus of claim 12 wherein the height of said feed slot is less than the height of two elements whereby stacked elements are prevented from reaching said receiving means.

14. The apparatus of claim 12 wherein said transfer means comprises a pickup wheel having a vacuum applying source, said conveying means having an arcuate recess for accommodating a sector of said pickup wheel, said receiving means comprising cavities spaced about the periphery of said pickup wheel, with each cavity communicating with said vacuum applying source, and spaced so that at least two of said cavities are present in the sector of said pickup wheel disposed in the recess in said conveying means.

15. The apparatus of claim 14 including a rotatable probe carrier having a plurality of test probe means, each of said test probe means being in alignment with one of said cavities, and said means for introducing said test probe means into the central opening of a magnetic element comprising a cam track against which said plurality of test probe means ride as said probe carrier rotates with said pickup wheel with said cam being arranged to cause the insertion of a test probe means into the central opening of a magnetic element while the magnetic element is at said test station.

16. The apparatus of claim 12 wherein said transfer means includes a vacuum applying means associated with said receiving means for enabling said receiving means to pick up said magnetic elements at the pickup station; and said sorting means including air supplying means for overcoming the vacuum force at said receiving means thereby enabling the magnetic element to be ejected out of said receiving means.

17. Apparatus for sorting magnetic cores having a central opening therein comprising;
a pickup station;
conveying means for feeding a plurality of magnetic cores at said pickup station;
a testing station having means for testing preselected characteristics of said magnetic cores;
means for carrying the magnetic cores between said pickup station and said testing station;
a test probe carrier having a plurality of test probes, arranged for reciprocation within said carrier;
means for rotating said carrier;
stationary cam means adjacent said carrier for moving said test probes into the central openings of cores at said test station whereby the testing for the preselected characteristics may be conducted, while the magnetic cores are in said carrying means; and
a sorting station having means for ejecting the magnetic cores from said carrying means.

18. A method of sorting magnetic elements in response to preselected tests thereupon comprising the steps of:
presenting a plurality of pickup means for receiving magnetic elements substantially simultaneously at a pickup station;
feeding a plurality of magnetic elements to the pickup station and exposing the plurality thereof substantially simultaneously to the pickup means;
transferring the magnetic elements into the pickup means;
carrying the magnetic elements to a testing station and performing preselected tests thereon;
storing results of the preselected tests in a storage means until the tested magnetic elements reach an accept station; and
sorting the magnetic elements by ejecting them from the pickup means in response to the results of the preselected tests.

19. A method of sorting magnetic elements in response to preselected tests thereupon comprising the steps of:
feeding a plurality of magnetic elements to a pickup station and exposing the plurality of magnetic elements simultaneously thereat;
presenting a sector of a rotatable transfer wheel having a plurality of peripheral vacuum pockets at the pickup station and transferring the magnetic elements into the vacuum pockets by drawing a vacuum to said pockets;
carrying the magnetic elements to a testing station and performing preselected tests thereon by carrying test probes associated with each vacuum pocket between the pickup station and testing stations and inserting a test probe into a magnetic element at the test station and into engagement with electrical contacts located at the testing station for carrying out the preselected tests; and
sorting the magnetic elements by ejecting the elements from the pickup means either at an accept station or a reject station in response to the results of the tests.

20. In a test system having a number of stations for feeding, testing and sorting miniature articles, the improvement comprising:
a rotatable wheel having a plurality of pickup pockets adapted to receive the miniature articles by their outside surface;
testing means including a plurality of test devices corresponding in number to said pickup pockets;
means for rotating said wheel and said test devices in unison whereby an article and a corresponding test device are moved between the feeding and testing stations in accurate alignment to enable a test at the testing station; and
means at the testing station for causing said test device to perform a test upon a corresponding article.